US012190758B2

(12) United States Patent
Wölfl et al.

(10) Patent No.: US 12,190,758 B2
(45) Date of Patent: Jan. 7, 2025

(54) CABLE-LABELLING TAG WITH HOLDER INTENDED FOR PUSHING INTO A LABELLING GROMMET, KIT COMPRISING LABELLING GROMMET AND CABLE-LABELLING TAG, AND ALSO CABLE WITH KIT

(71) Applicant: Schaeffler Technologies AG & Co. KG, Herzogenaurach (DE)

(72) Inventors: Carsten Wölfl, Lichtenau (DE); Rudi Jörger, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 127 days.

(21) Appl. No.: 17/916,112

(22) PCT Filed: Mar. 5, 2021

(86) PCT No.: PCT/DE2021/100224
§ 371 (c)(1),
(2) Date: Sep. 30, 2022

(87) PCT Pub. No.: WO2021/197535
PCT Pub. Date: Oct. 7, 2021

(65) Prior Publication Data

US 2023/0162625 A1 May 25, 2023

(30) Foreign Application Priority Data

Mar. 31, 2020 (DE) ........................ 102020108845.0

(51) Int. Cl.
*G09F 3/20* (2006.01)

(52) U.S. Cl.
CPC .................................... *G09F 3/205* (2013.01)

(58) Field of Classification Search
CPC ............................... G09F 3/0295; G09F 3/205
(Continued)

(56) References Cited

U.S. PATENT DOCUMENTS 292,632 A * 1/1884 Dwenger .................. G09F 3/14 40/667
866,379 A * 9/1907 Monroe .................... G09F 3/14 40/667
(Continued)

FOREIGN PATENT DOCUMENTS

DE 29707129 6/1997
DE 10017871 10/2001
(Continued)

OTHER PUBLICATIONS

"Murrplastik label sleeve KT3/30" with manufacturer's item No. 86203016, which can be obtained from the website www.elektro4000.de (Jan. 1, 2022—Admitted Prior Art).

*Primary Examiner* — Cassandra Davis
(74) *Attorney, Agent, or Firm* — Volpe Koenig

(57) ABSTRACT

A cable-labelling tag (1) for attaching to a cable (11), with a labelling surface (3), which is on a front side (2) and is designed for displaying a series of alphanumeric characters, and with a holder (5) on the opposite rear side (4). The holder (5) is geometrically and materially designed to be fixed in a labelling-tag-receiving pocket (6) of a labelling grommet (7). A having a labelling grommet (7) and such a cable-labelling tag (1) is also provided, along with cable (11) with such a kit fastened on it.

8 Claims, 5 Drawing Sheets

(58) Field of Classification Search
USPC .... 40/652, 640, 666, 467, 661.04, 660, 659, 40/316
See application file for complete search history.

(56) References Cited

U.S. PATENT DOCUMENTS

| | | | | |
|---|---|---|---|---|
| 6,330,758 | B1 * | 12/2001 | Feibelman | G02C 11/00 70/57.1 |
| 10,685,589 | B1 * | 6/2020 | Juzefczyk | G09F 23/10 |
| 2006/0048418 | A1 | 3/2006 | Boire et al. | |
| 2012/0260543 | A1 | 10/2012 | Dunn et al. | |

FOREIGN PATENT DOCUMENTS

| | | | |
|---|---|---|---|
| DE | 102008003995 | | 7/2009 |
| EP | 0115055 | | 12/2003 |
| JP | 2010281390 | A | 12/2010 |
| KR | 101992242 | | 6/2019 |

* cited by examiner

CABLE-LABELLING TAG WITH HOLDER INTENDED FOR PUSHING INTO A LABELLING GROMMET, KIT COMPRISING LABELLING GROMMET AND CABLE-LABELLING TAG, AND ALSO CABLE WITH KIT

CROSS-REFERENCE TO RELATED APPLICATIONS

This application is the U.S. National Phase of PCT Appln. No. PCT/DE2021/100224, filed Mar. 5, 2021, which claims the benefit of German Patent Appln. No. 10 2020 108 845.0, filed Mar. 31, 2020, the entire disclosures of which are incorporated by reference herein.

TECHNICAL FIELD

The disclosure relates to a cable-labeling tag for attaching to a cable, in particular a cable as is commonly used in the automotive sector.

BACKGROUND

A cable-labeling tag, also known as a label carrier, is already known from the prior art. DE 100 17 871 A1 discloses a label carrier for attaching labels to elongate objects, in particular cables with a small diameter, with an essentially flat carrier area and a fastening area connected thereto, which can be attached to the elongate object. It is found to be particular that the fastening area comprises at least one elastic holder element extending at least partially around the elongated object. It is also particularly emphasized there that the labels can be attached to elongated objects, in particular to a cable, reliably and without the risk of damage.

Reusable cuffs and systems with insertable labeling fields are also known from DE 10 2008 003 995 A1. A reusable sleeve system with a labeling field for labeling cables and lines are presented there. This cuff system consists of a flexible plastic claw and an elastic cable cuff. The cable sleeve has a plurality of knobs in the cable guide to fix the cables and lines that it encloses. The cable cuff itself is equipped with a guide and a stop to receive the plastic claw. The flexible plastic claw encloses and fixes the cable cuff. The cable cuff serves as a labeling carrier for labeling labels and/or braille labels. The cable cuff can also be made of sheet metal and then provided with Braille lettering.

There are also commercially available cable-labeling tags, such as the "Murrplastik label sleeve KT3/30" with manufacturer's item number 86203016, which can be obtained from the website www.elektro4000.de. Similar labeling grommets or sleeves are also available from other manufacturers, who designate them as "PATG", for example, which are intended to accommodate plug-in labels similar to cable-labeling tags.

In particular in special machine construction, however, there are disadvantages in terms of applicability for the cable-labeling tags and labeling grommets and label carriers known from the prior art. The conventional labeling surfaces are too small, since more information has to be put on the labeling tag in special machine construction than in other areas of technology. In particular, with conventional labeling grommets or sleeves of the "PATG" type or of the "Murrplastik label sleeve KT3/30" type, it is sufficient that only small insert labels, i.e., in particular those with external dimensions of 30 mm by 4 mm, can be inserted. Larger labeling surfaces are not available.

SUMMARY

The object of the present disclosure is to mitigate the disadvantages of the prior art or even to overcome them completely.

This object is achieved with a cable-labeling tag for fixing to a cable in that it is provided with a labeling surface on a front side, which is designed to show an alphanumeric character string, and on the opposite rear side has a holder. According to the disclosure, the holder is designed geometrically and materially in order to be fixed (in a form-fitting and/or force-fitting manner), preferably locked, in a labeling-tag-receiving pocket of a labeling grommet.

What is unusual about the approach according to the disclosure is that a large cable-labeling tag is only pushed or inserted with a holder provided for attachment into the labeling-tag-receiving pocket that is otherwise provided for receiving an insert tag, and is thus fixed on the outside of the labeling grommet, and not within it. In this way, a much larger surface can be made available. While the use of conventional labeling grommets, which are only designed to accommodate insert tags measuring 30 mm by 4 mm or even 23 mm by 4 mm, a simple 'trick' can now be used to use standard components, while the special requirements of special machine construction, namely more extensive and larger labeling purposes, are also taken into account. Adhesive solutions are not used in order to enable easy redetachment.

It is now possible to print a cable equipment identification on a single cable-labeling tag and to print other additional information, such as a PLC address of the target. The otherwise usual great effort of attaching two different labels to the cable, in particular with the inappropriate use of cable ties, for example, which do not allow a robust solution, is avoided. A permanent and resilient solution is now being made available. In particular, even a labeling surface of 12 mm by 40 mm can be used to carry out legible printing.

In other words, a larger labeling surface is now possible when using standard cable-labeling grommets. A mechanism is provided below the cable-labeling tag/labeling tag, which allows a conventional cable-labeling grommet to be inserted into the opening. The labeling surface itself therefore protrudes beyond the labeling grommet and can be made in the desired sizes.

This gives the advantage of a labeling surface of even approx. 12×40 mm, easy mounting in standard labeling grommets, laser printability in a magazine, e.g., with a laser Thermomark Neo, secure installation to prevent loss in case of displacement, easy mounting by means of insertion and the presence of a labeling surface outside the labeling grommet. Finally, the disclosure also relates to a method for mounting a cable-labeling tag/labeling tag by inserting it into a labeling grommet; for example, in the manner of a "PATG" label carrier. In the case of the labeling tag, the labeling surface is outside of the grommet and the opening in the grommet itself is used to mount the labeling tag. This results in the possibility of significantly enlarging the labeling surface.

The essence of the disclosure is therefore to provide a cable-labeling tag and a labeling grommet, wherein the cable-labeling tag has a mechanism on the underside, opposite the labeling surface, for insertion into an opening of the labeling grommet. The labeling surface of the cable-labeling tag is arranged on the outside and preferably above the labeling grommet and can be designed with different dimensions.

Advantageous embodiments are explained in more detail below.

It is advantageous if the holder is aligned in the longitudinal direction of the labeling surface, i.e., preferably collinear with the longitudinal axis of a cable to be labeled. In this way, the overall structure is relatively slim and takes up little space.

An advantageous embodiment is also characterized in that the holder has an L-shape and/or is designed like a safety pin. In this way, the holder can be manufactured easily, for example, by means of injection molding, and also offers the possibility of simple assembly.

If the holder has a free end which faces a delimiting element on the rear side, the security against loss is increased.

It has also proven useful if the delimiting element has an L-shaped contour/an L-shape. The production, e.g., using injection molding techniques, is kept simple. A stop when pushing/inserting the holder into the labeling-tag-receiving pocket/insert labeling-tag-receiving pocket is also made easier.

It has also proven useful if a free end of the delimiting element defines an inclined surface, the imaginary extension of which intersects the longitudinal axis of the labeling surface perpendicularly and occupies an acute or obtuse angle, but #90°, to the rear side. Lose-ability is thereby reduced.

If there is a constant air gap between the free end of the delimiting element and the free end of the holder, the holder can be simply lifted away from the rear side of the cable-labeling tag with its free end when inserting/sliding in the holder in a preceding step. After inserting the holder, the holder snaps back into its original position and is secured. This ensures a permanent connection between the cable-labeling tag and the labeling grommet. An integrated lock can be provided. Separate locking means are also possible.

In addition, it has proven useful if the holder runs parallel to the rear side and/or parallel to the front side, in particular when it is fastened to the fastening grommet. The height of a kit consisting of a labeling grommet and a cable-labeling tag is then kept low.

The precision of holding together the cable-labeling tag and the labeling grommet is increased if the holder has a rectangular cross-section and is preferably matched to the cross-section of the labeling-tag-receiving pocket without play. The longitudinal edges of the holder then literally bite into the material of the labeling grommet.

It is particularly valuable if the front side has a larger surface than an underside of the holder and/or the delimiting element that faces away from the rear side. As a result, many alphanumeric characters can be applied to the labeling surface; for example, printed on it.

It is particularly advantageous, in particular for rapid assembly, if the holder is designed as a clip.

It has proven particularly useful when the holder is prepared to be fixed in the labeling-tag-receiving pocket in a force-fitting and/or form-fitting manner, wherein the labeling-tag-receiving pocket is designed to receive an insert tag with the dimensions 30 mm×4 mm or 23 mm×4 mm. Standard labeling grommets can then be kept in storage at low cost.

It has proven particularly useful in practice if the labeling surface is larger than 120 $mm^2$ or at least larger than 92 $mm^2$ but smaller than 600 $mm^2$ or at least smaller than 500 $mm^2$, preferably exactly 480 $mm^2$.

It is advantageous if a base body forming the labeling surface is designed in the manner of a flat board of constant thickness, preferably made of plastic, e.g., silicone, wherein the one-material and/or one-piece holder protrudes from the rear side and/or the holder has restoring properties relative to the base body.

The disclosure also relates to a kit consisting of a labeling grommet and a cable-labeling tag for labeling of the type according to the disclosure, wherein the holder is held in the labeling-tag-receiving pocket of the labeling grommet in a force-fitting and/or form-fitting manner.

It is advantageous if a first end of the material of the labeling grommet defining the labeling-tag-receiving pocket is encompassed by the holder and/or a second end of the material of the labeling grommet defining the labeling-tag-receiving pocket is surrounded by the delimiting element.

Finally, the disclosure also relates to a cable with a kit according to the disclosure fastened on it.

BRIEF DESCRIPTION OF THE DRAWINGS

The disclosure is explained in more detail below with the aid of a drawing. A first embodiment is shown. In the figures.

DETAILED DESCRIPTION

The figures are only schematic in nature and serve only for comprehension of the disclosure. The same elements are provided with the same reference symbols.

Figure 1:
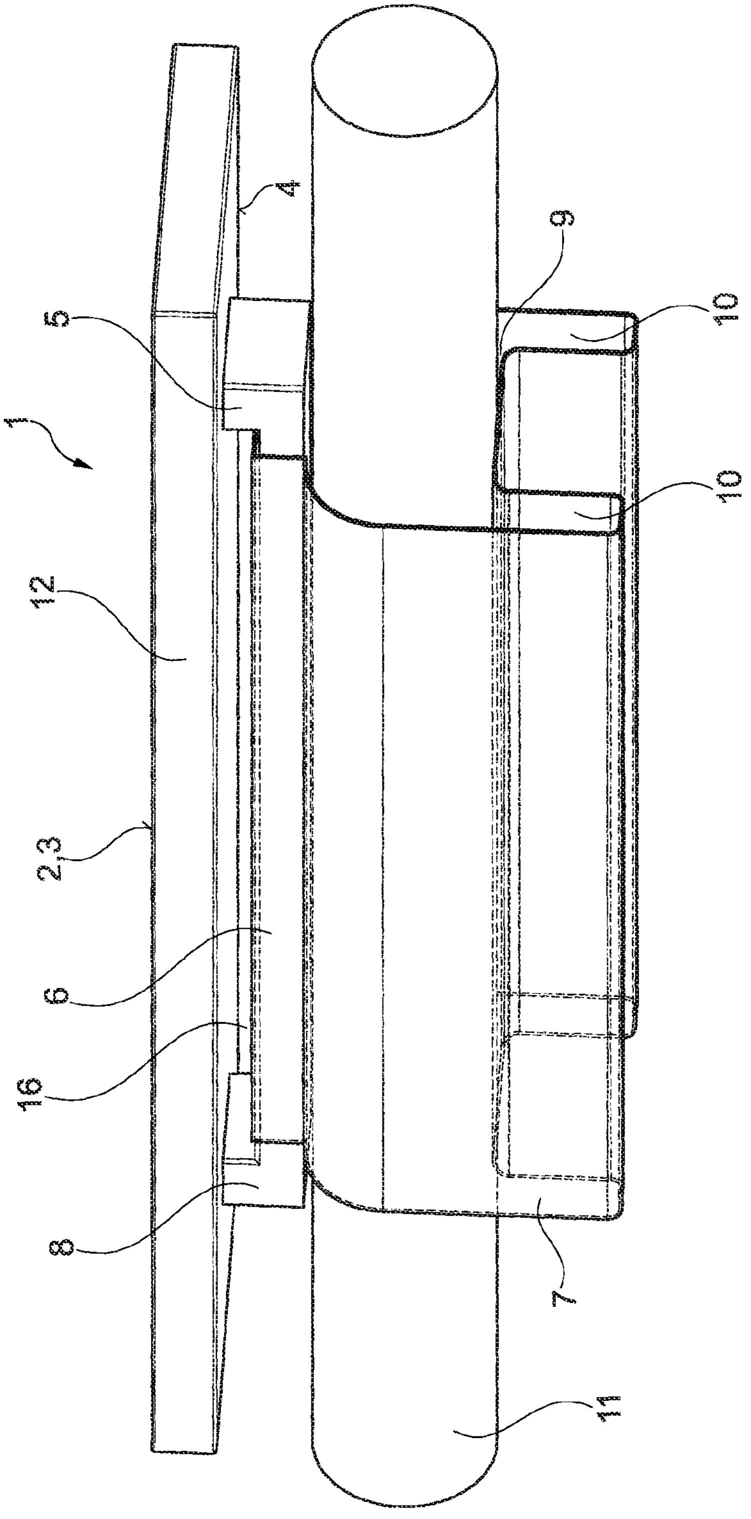
FIG. 1 shows a perspective view of a cable-labeling tag according to the disclosure in the state fixed to a labeling grommet, in which the holder of the cable-labeling tag engages in a labeling-tag-receiving pocket of the labeling grommet.

FIG. 1 shows a first embodiment of a cable-labeling tag 1 according to the disclosure. It has a front side 2 which defines a labeling surface 3. It is designed to show alphanumeric characters not shown in FIG. 1.

Figure 2:
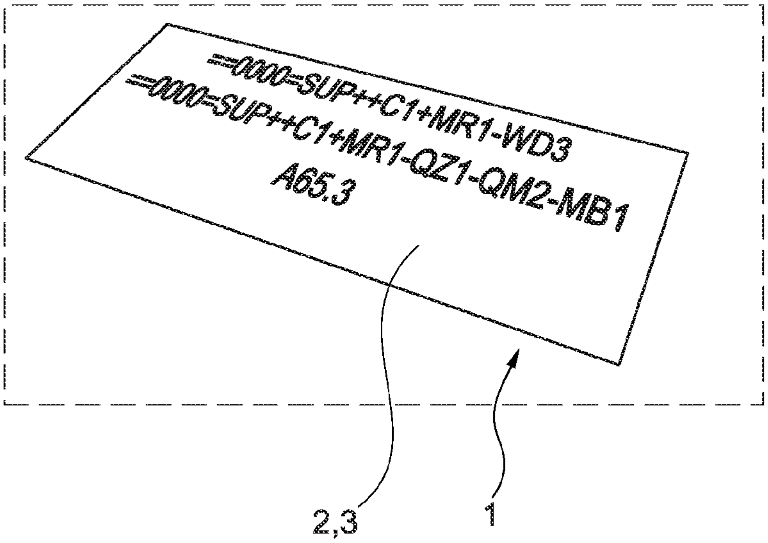
FIG. 2 shows the cable-labeling tag from FIG. 1 in a view from above.

However, these alphanumeric characters can be seen in the representation according to FIG. 2, which provides a view of the front side 2 with the formation of the labeling surface 3.

Coming back to FIG. 1, it can be seen that a holder 5 protrudes on a rear side 4 of the cable-labeling tag 1. The holder 5 is inserted into a labeling-tag-receiving pocket 6 of a labeling grommet 7.

The holder 5 has a rectangular cross-section. It has an L shaped arm 17. A delimiting element 8 has the same cross-section and the same L shape, but with a shorter (main) leg. The secondary legs of both components 5 and 8 are of the same length and width.

The labeling grommet 7 has a cable-holding pocket 9 next to the labeling-tag-receiving pocket 6, more precisely (further) away from the cable-labeling tag 1. This cable-holding pocket 9 could also be referred to as a channel. Likewise, the labeling-tag-receiving pocket 6 could be referred to as a shaft.

The cable-holding pocket 9 defines two legs 10 pointing away from the cable-labeling tag 1. Ultimately, a cable 11 inserted into the cable-holding pocket 9 is surrounded on all sides by the material of the labeling grommet 7. The material of the labeling grommet 7 therefore encloses the cable 11.

Figure 3:
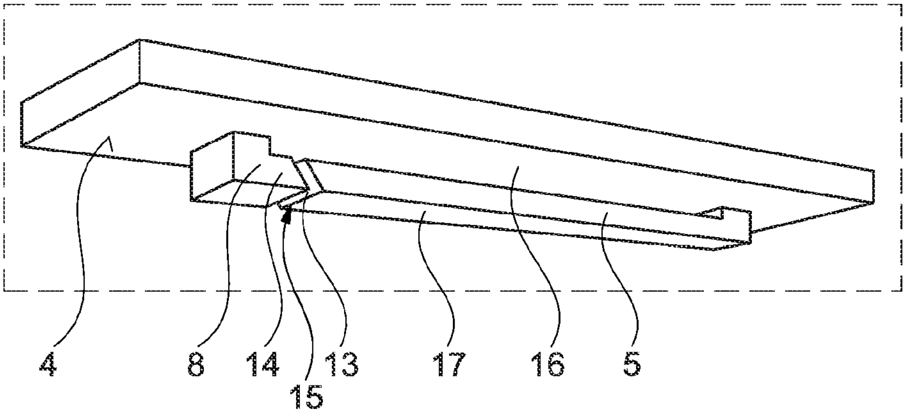
FIG. 3 shows the cable-labeling tag from FIG. 2 in a perspective view from below.

The clip-like design of the cable-labeling tag 1 can be seen in FIG. 3. A base body 12 forms the labeling surface 3 on the front side 2. Both the holder 5 and the delimiting element 8 are arranged on the rear side 4. The delimiting element 8 and the holder 5 each have a free end 13 and a free end 14. There is an air gap 15 between the two free ends 13 and 14. An empty space 16 is arranged between the holder 5 and the rear side 4.

The free ends 13 and 14 have the same spatial orientation and define two spaced-apart planes which lie obliquely in space but perpendicularly intersect a longitudinal axis of the cable-labeling tag or an axis of symmetry of the cable 11.

Figure 4:
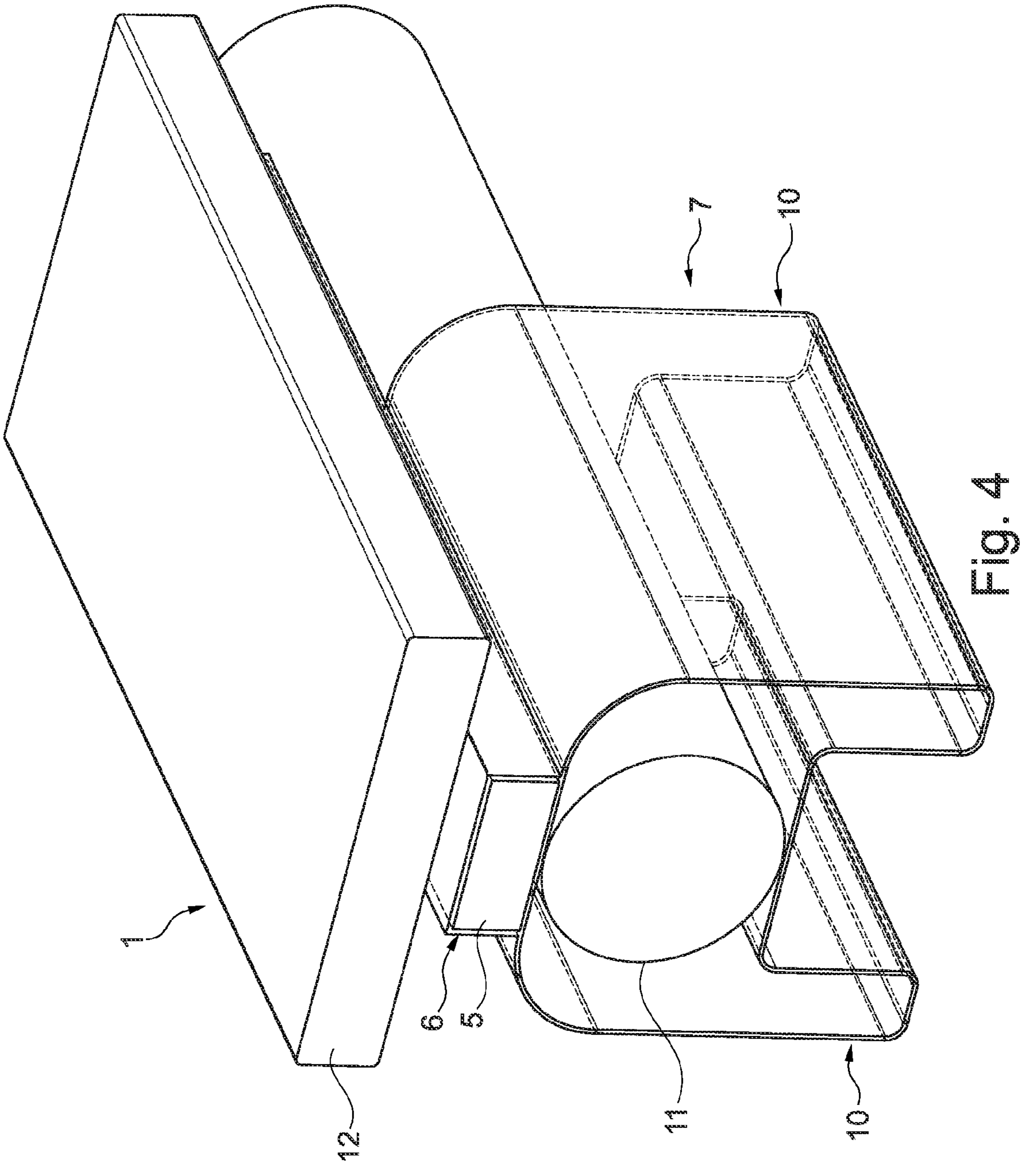
FIG. 4 shows a cross-sectional representation of the kit consisting of a cable-labeling tag and a label grommet according to FIG. 1.

In the section as shown in FIG. 4, the focus is on the adaptation of the holder 5 to the labeling-tag-receiving pocket 6.

Figure 5:
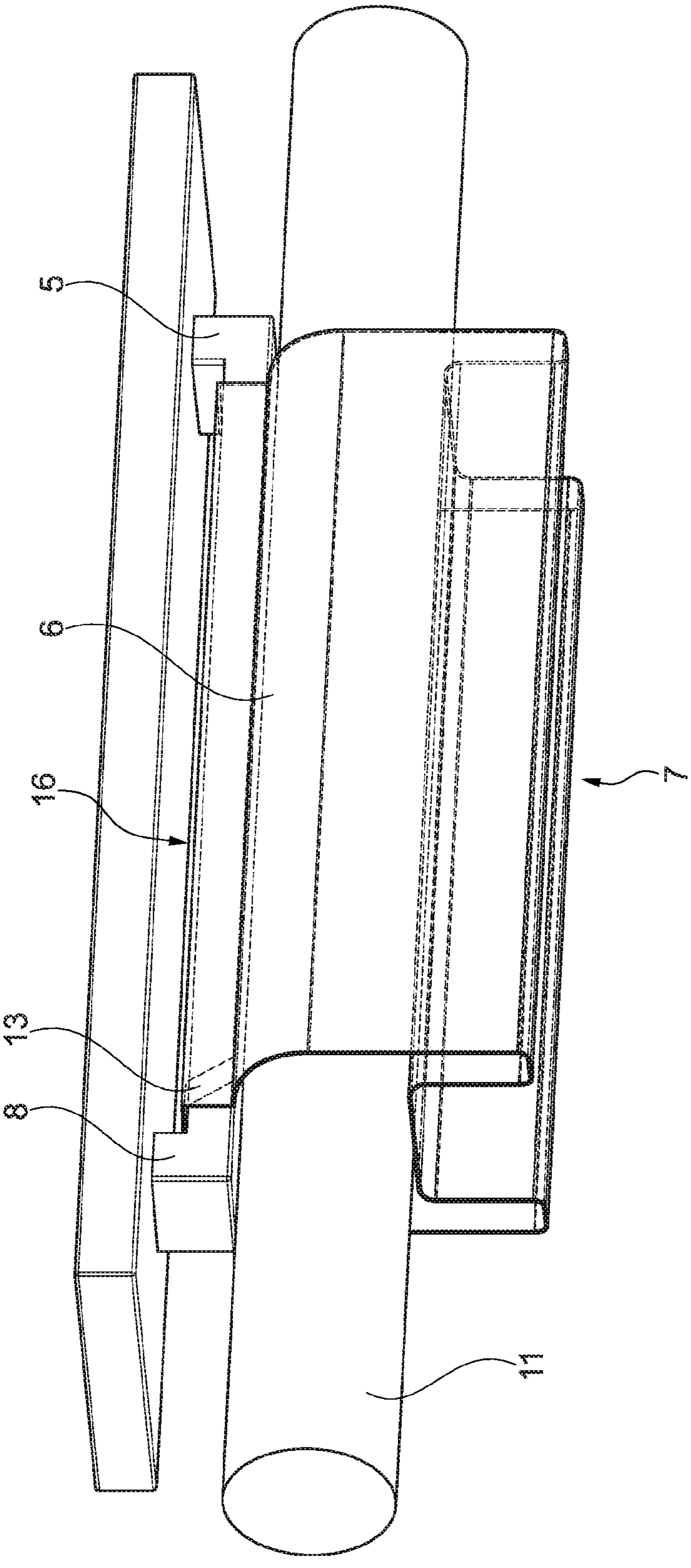
FIG. 5 shows a further perspective view of the kit from FIG. 4 mounted on the cable.

It can be seen from FIG. 5 that the combination of the delimiting element 8 and the holder 5 is significantly longer than the labeling-tag-receiving pocket 6 and/or the labeling grommet 7 in general.

Figure 6:
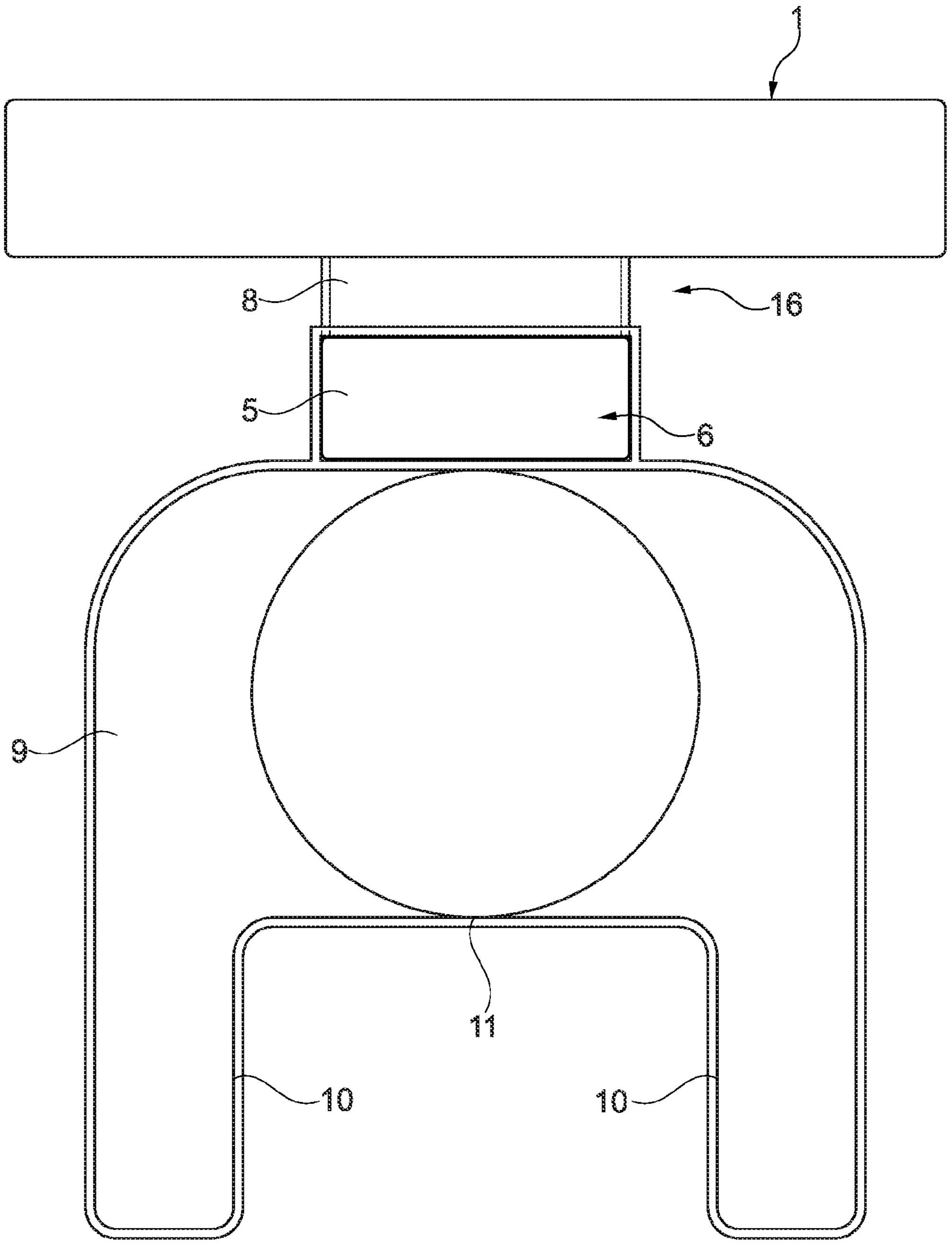
FIG. 6 shows a cross-section through the cable-labeling tag with its holder, which is placed in the labeling-tag-receiving pocket of the labeling grommet.

The adaptation of the individual cross-sections to one another can be seen from FIG. 6.

LIST OF REFERENCE SYMBOLS

1 Cable-labeling tag
2 Front side
3 Labeling surface
4 Rear side
5 Holder
6 Labeling-tag-receiving pocket
7 Labeling grommet
8 Delimiting element
9 Cable-holding pocket
10 Leg
11 Cable
12 Base body
13 Free end
14 Free end
15 Air gap
16 Empty space
17 L shaded arm

The invention claimed is:

1. A cable-labeling tag for attaching to a cable, the cable-labeling tag comprising:
- a labeling surface, which is on a front side and is configured to display a series of alphanumeric characters;
- a holder on an opposite rear side, the holder having a free end which faces a delimiting element on the rear side, wherein a length of the holder is greater than a length of the delimiting element in a longitudinal direction of the labeling surface; and
- a base body that forms the labeling surface that is configured as a flat board of constant thickness, the holder is at least one of formed of one-material or as one-piece that protrudes from the rear side;
- wherein the holder is geometrically and materially configured to be fixed in a labeling-tag-receiving pocket of a labeling grommet.

2. The cable-labeling tag according to claim 1, wherein the holder is aligned in the longitudinal direction of the labeling surface.

3. The cable-labeling tag according to claim 1, wherein the holder is at least one of L-shaped or safety pin-shaped.

4. The cable-labeling tag according to claim 1, wherein the holder is configured to be fixed in the labeling-tag-receiving pocket in at least one of a force-fitting or form-fitting manner.

5. The cable-labeling tag according to claim 1, wherein the labeling surface is larger than 120 $mm^2$ but smaller than 600 $mm^2$.

6. The cable-labeling tag according to claim 1, wherein the holder has restoring properties relative to the base body on which the labeling surface is formed.

7. A kit consisting of:
- a labeling grommet including a labeling-tag-receiving pocket;
- a cable-labeling tag comprising:
  - a labeling surface, which is on a front side and is configured to display a series of alphanumeric characters; and
  - a holder on an opposite rear side, wherein the holder is geometrically and materially configured to be fixed in the labeling-tag-receiving pocket of the labeling grommet, and wherein the holder is held in the labeling-tag-receiving pocket of the labeling grommet in at least one of a force-fitting or form-fitting manner; and
  - a cable with the kit fastened on the cable.

8. The kit according to claim 7, wherein at least one of a) a first end of a material of the labeling grommet defining the labeling-tag-receiving pocket is encompassed by the holder or b) a second end of the material of the labeling grommet defining the labeling-tag-receiving pocket is surrounded by a delimiting element.

* * * * *